(12) United States Patent
Schmid-Schoenbein

(10) Patent No.: US 10,720,615 B2
(45) Date of Patent: Jul. 21, 2020

(54) BATTERY MODULE WITH BATTERY CELL SYSTEM AND ENCLOSURE

(71) Applicant: Robert Bosch GmbH, Stuttgart (DE)

(72) Inventor: Christian Schmid-Schoenbein, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 147 days.

(21) Appl. No.: 15/841,541

(22) Filed: Dec. 14, 2017

(65) Prior Publication Data
US 2018/0175346 A1 Jun. 21, 2018

(30) Foreign Application Priority Data
Dec. 15, 2016 (DE) .......................... 10 2016 225 184

(51) Int. Cl.
*H01M 2/10* (2006.01)
*H01M 10/647* (2014.01)
(Continued)

(52) U.S. Cl.
CPC ......... *H01M 2/1077* (2013.01); *H01M 2/021* (2013.01); *H01M 2/0242* (2013.01); *H01M 2/0267* (2013.01); *H01M 2/0275* (2013.01); *H01M 2/0285* (2013.01); *H01M 2/0295* (2013.01); *H01M 2/206* (2013.01); *H01M 10/613* (2015.04); *H01M 10/625* (2015.04); *H01M 10/647* (2015.04); *H01M 10/6554* (2015.04); *H01M 10/6555* (2015.04); *H01M 2220/10* (2013.01); *H01M 2220/20* (2013.01)

(58) Field of Classification Search
CPC .. H01M 2/021; H01M 2/0242; H01M 2/0247; H01M 2/0267; H01M 2/0275; H01M 2/1077; H01M 10/6555; H01M 2/1061
USPC .......................................................... 429/163
See application file for complete search history.

(56) References Cited

U.S. PATENT DOCUMENTS

2005/0208374 A1* 9/2005 Sakurai ............... H01M 2/0275
429/162
2009/0023057 A1 1/2009 Kim
(Continued)

FOREIGN PATENT DOCUMENTS

| WO | 2014038891 | 3/2014 |
| WO | 2015140952 | 9/2015 |

*Primary Examiner* — James M Erwin
(74) *Attorney, Agent, or Firm* — Michael Best & Friedrich LLP

(57) ABSTRACT

A battery module (100) comprising at least one battery cell system (1) having at least two battery cells (11), wherein the battery cell system (1) comprises a pouch film (3) and at least two electrode composites (5), wherein an electrode composite (5) comprises at least one anode and at least one cathode, and wherein the pouch film (3) forms pockets (12) separated from one another, in particular situated alongside one another, for introducing respectively at least one electrode composite (5), such that each pocket (12) together with electrode composite (5) forms a pouch cell (10), and wherein the pockets (12) are connected to one another physically in a foldable manner via the pouch film (3) and wherein the battery module (100) has a movement-flexible, foldable enclosure (20), which encloses the entire battery cell system (1) and the voltage tap of the battery module (100).

28 Claims, 9 Drawing Sheets

(51) Int. Cl.
   *H01M 2/02*     (2006.01)
   *H01M 2/20*     (2006.01)
   *H01M 10/6554*  (2014.01)
   *H01M 10/6555*  (2014.01)
   *H01M 10/613*   (2014.01)
   *H01M 10/625*   (2014.01)

(56) References Cited

U.S. PATENT DOCUMENTS

| | | | |
|---|---|---|---|
| 2010/0136405 A1 | 6/2010 | Johnson et al. | |
| 2012/0189890 A1* | 7/2012 | Mitsuda | H01G 11/10 |
| | | | 429/94 |
| 2013/0000110 A1 | 1/2013 | Takeda et al. | |
| 2013/0273413 A1 | 10/2013 | Fahlgren et al. | |
| 2015/0037657 A1* | 2/2015 | Hu | H01M 2/202 |
| | | | 429/158 |
| 2015/0155596 A1* | 6/2015 | Gardner | H01M 2/24 |
| | | | 429/94 |
| 2015/0380697 A1* | 12/2015 | Osborne | H01M 2/1061 |
| | | | 429/91 |
| 2016/0099454 A1* | 4/2016 | Kwon | H01M 2/204 |
| | | | 429/159 |

* cited by examiner

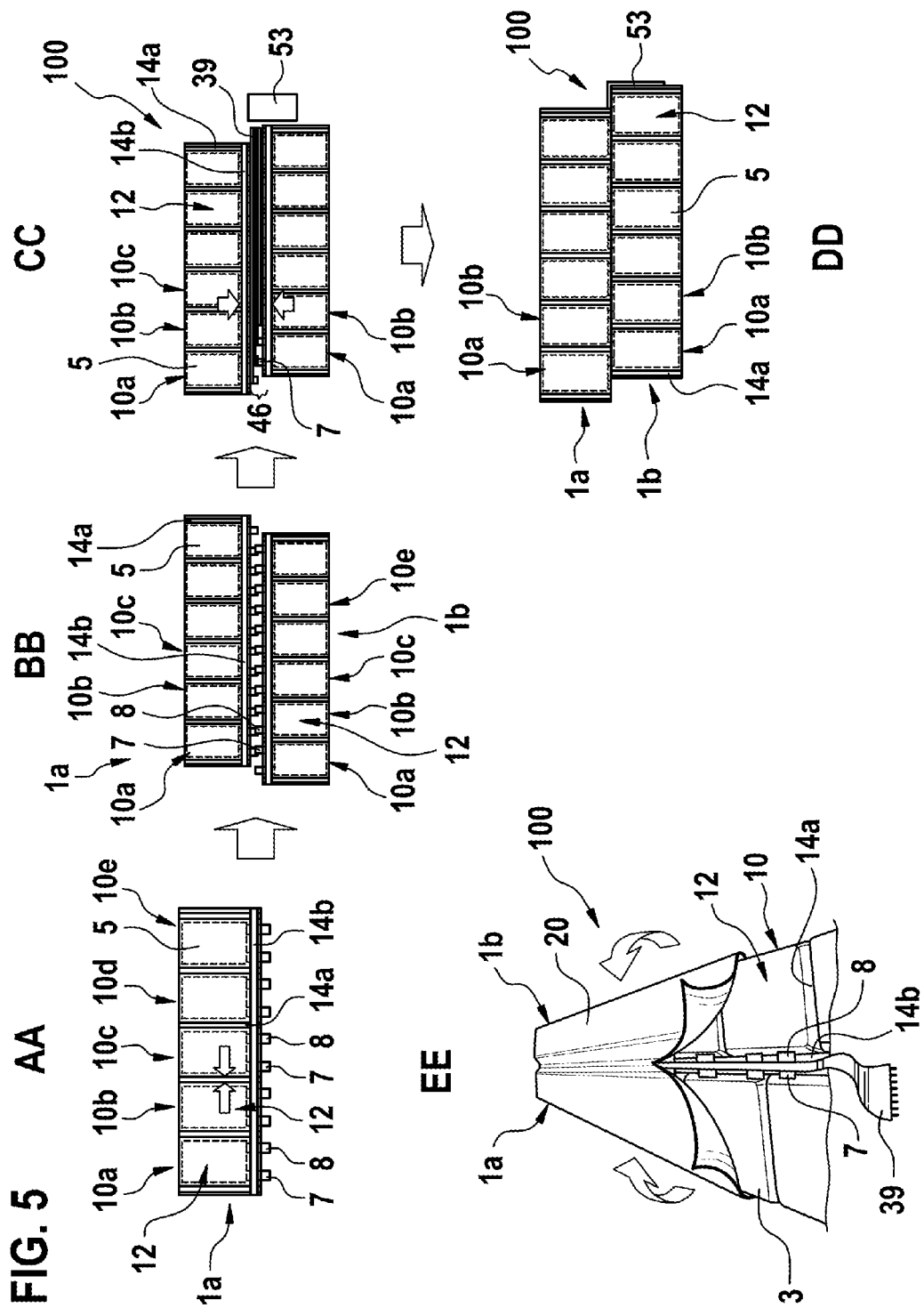

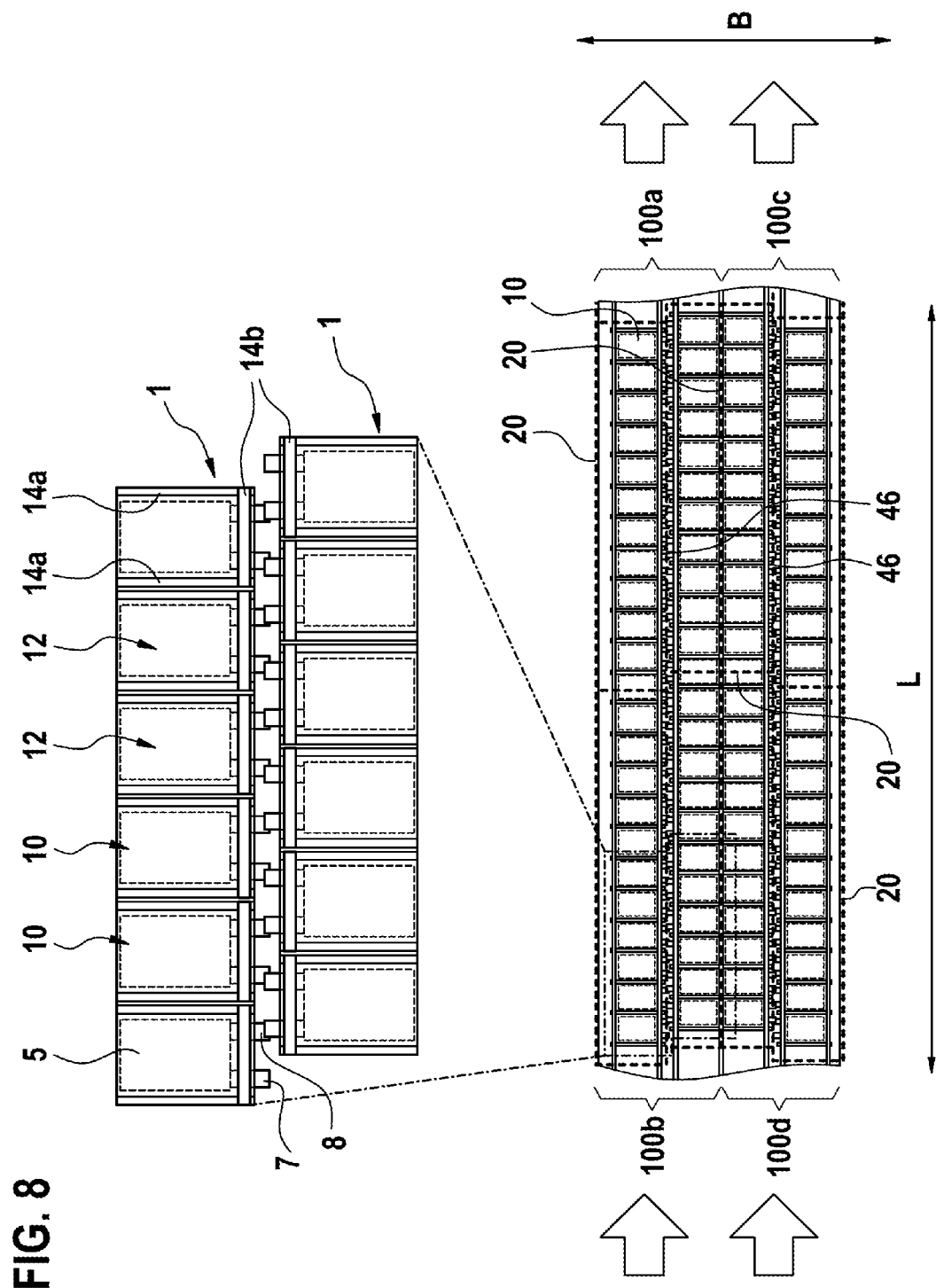

BATTERY MODULE WITH BATTERY CELL SYSTEM AND ENCLOSURE

BACKGROUND OF THE INVENTION

The present invention relates to a battery module comprising at least one battery cell system having at least two pouch cells, to a method for producing same, and to a battery and the use thereof.

A battery is an electrochemical energy store which, in the course of the discharge thereof, converts the stored chemical energy into electrical energy by means of an electrochemical reaction. It is becoming apparent that in the future, in stationary applications, such as wind power installations, in motor vehicles designed as hybrid or electric motor vehicles, and also in electronic devices, new battery systems will be used which will need to satisfy very stringent requirements in respect of reliability, safety, performance and lifetime. On account of their high energy density, in particular lithium-ion batteries are used as energy stores for electrically driven motor vehicles.

Batteries, in particular lithium-ion batteries, having at least one battery module or comprising a plurality of battery modules are already known from the prior art. A battery module comprises for example a plurality of battery cells which are joined together with one another to form a battery module and are electrically interconnected with one another. In this case, the electrical interconnection can be effected in parallel or in series.

US 2013/0273413 discloses a battery having a multiplicity of cells arranged on a plate. In the state ready for operation, the battery assumes an asymmetrical shape, as a result of which available space within a portable electronic device can be utilized.

WO 2014/038891 discloses a secondary battery having a multiplicity of electrode ensembles that are introduced in indentations of a continuous enclosure. The enclosure is then separated in each case between the electrode ensembles, such that the electrode ensembles are present in a manner separated from one another in the indentations thereof.

US 020100136405 A1 discloses a battery module having round cells which comprises a cladding that covers and electrically insulates a contour of the battery cells. The cladding can also directly enclose the battery cells in order to prevent contaminations. In this case, each battery cell is surrounded by a separate moisture-tight housing.

SUMMARY OF THE INVENTION

The invention provides a battery module, comprising at least one battery cell system having at least two pouch cells, a method for producing same, and a battery, in particular a lithium-ion battery, and the use thereof.

In the context of this invention, the term enclosure should be understood to mean a movement-flexible film.

In one embodiment, the enclosure is a composite film.

In one embodiment, the enclosure is embodied to be moisture-permeable, for example when the pouch films of the pouch cells are embodied to be moisture-tight.

In an alternative embodiment, the enclosure is embodied to be moisture-impermeable, in particular when the pouch films of the pouch cells are embodied to be moisture-permeable. The enclosure then comprises, for example, aluminum, steel, a polyphenylene sulfide, a polynorbornene and/or a liquid crystal polymer.

In the context of this invention, the term pouch film should be understood to mean a flexible film, in particular a composite film, which is electrolyte-impermeable. The pouch film comprises for example a composite composed of polyamide, polypropylene, polyethylene terephthalate, polypropylene and/or metal, in particular aluminum.

The term battery cell system should be understood to mean a plurality of pouch cells which together form a battery module. The smallest unit of a battery module according to the invention is formed by two pouch cells.

In the present invention, the term battery module should be understood to mean a unit which comprises at least one battery cell system.

In the present invention, the term voltage tap of a battery module should be understood to mean components and/or low-current lines that constitute an electrical connection between the cell monitoring system (CSC Cell Supervising Circuit) and an anode and/or cathode contact lug and/or a cell connector that contacts an anode contact lug and a cathode contact lug. In this case, the voltage tap comprises low-current tabs and/or balancing lines that electrically contact the cell monitoring system CSC.

The cell monitoring system CSC performs the cell monitoring with regard to the cell voltage and cell temperature and also the charge balancing between the individual battery cells or pouch cells. Furthermore, the CSC communicates with superordinate control units. In one particularly advantageous embodiment, the CSC is arranged within the enclosure.

In the present invention, the term cell connectors should be understood to mean components that electrically contact anode contact lugs and/or cathode contact lugs of the battery system(s). Said cell connectors are for example flexible and bendable, such that two pouch cells of different battery cell systems or pouch cells of two different battery modules can be connected to one another. In the present invention, cell connectors that electrically connect two battery modules to one another are called module connectors. The cell connectors and module connectors are also arranged within the enclosure, for example. If, in the present invention, for example cell connectors and/or module connectors are connected to the contact lugs of the pouch cells within the enclosure, but in the further course extend through the enclosure to an exterior, then this is understood to mean that these components are enclosed by the enclosure because their region of electrical linking to the battery cell system is situated within the enclosure.

In the present invention, the term battery should be understood to mean a unit comprising one or more battery modules.

The invention discloses a battery module comprising at least one battery cell system, in particular a lithium-ion battery cell system, having at least two pouch cells.

The at least one battery cell system of the battery module comprises a pouch film and at least two electrode composites. In this case, an electrode composite comprises at least one anode and at least one cathode. The pouch film forms pockets separated from one another, in particular situated alongside one another, for introducing respectively at least one electrode composite, such that each pocket together with electrode composite forms a pouch cell. In particular in the operating state of the battery module, the pockets are connected to one another physically in a foldable manner via the pouch film. The battery module has a movement-flexible, foldable enclosure, which encloses the entire battery cell system and the voltage tap of the battery module.

What is advantageous in this case is that the pouch film and the enclosure are very flexible, pliable and foldable. Such a battery cell system is very flexibly configurable. The pouch film with the linked pockets and the enclosure are foldable in a wide variety of ways, such that the shape of the battery module is individually configurable, for example with regard to space requirement, size, folding techniques and contacting possibilities. What is additionally advantageous is that the battery module has no limit as far as the stack height is concerned. It is possible for example for a plurality of battery cell systems or battery modules to be stacked one on top of another and/or for at least one battery cell system to be folded in such a way that the linked pouch cells are present in a manner arranged one on top of another. Furthermore, the proposed battery module is flexible with regard to the cell chemistry used. It is possible to use for example a solid cell system for example comprising a solid as electrolyte. Alternatively, a liquid electrolyte is used. Moreover, the battery module having the battery cell system having the pouch film with pockets can be used at low, medium and high temperatures of up to 150° C., for example. What is furthermore advantageous is that the electrode composites introduced into the pockets of the pouch film can swell on account of the flexible pouch film surrounding them, for example as a result of processes of storing and withdrawing the lithium ions or owing to ageing. This prevents displacements and damage of the electrode composites on account of excessively high pressure acting thereon. Moreover, costs are saved since the production of the pouch film and the enclosure can be carried out continuously, which requires little expenditure in respect of labor and is very time-effective.

In one embodiment, the pouch film comprises no aluminum, in particular no metal. What is advantageous about a pouch film without aluminum, in particular without metal, is that there is no need for any electrical insulation, for example in the form of an insulation strip, at cut edges of the pouch film. Costs, material, time and labor are saved as a result. What is furthermore advantageous is that, by virtue of the fact that no aluminum or metal is introduced into the material, in particular the laminate, of the pouch film, the risk of corrosion of the pouch film is averted. Furthermore, a pouch film without aluminum, in particular metal, is embodied for example in a thinner and lighter fashion than pouch films comprising aluminum.

What is furthermore advantageous is that, in comparison with pouch films comprising aluminum, in the case of a pouch film without aluminum, in particular metal, in the composite a risk of a short circuit between the pouch cells that is caused by corrosion, an accident or metal particles of the pouch film cannot arise.

What is furthermore advantageous is that pouch films without aluminum, in particular metal, are deformable better than pouch films comprising aluminum or a metal. This is then advantageous for example if, for example during the production of a battery cell system comprising a corresponding pouch film, particles pass onto or into the pouch film in an undesired manner. The pouch film can then stretch around the particle and adapt thereto without being damaged or becoming perforated. What is additionally advantageous is that a material, in particular a laminate, without aluminum or without a metal is more cost-effective than a material comprising aluminum or a metal.

In one preferred embodiment, the battery module has a movement-flexible enclosure constituting a hermetic barrier to moisture. The enclosure encloses the entire battery cell system and the voltage tap of the battery module. In this case, the individual pouch cells have for example a moisture-permeable pouch film. Alternatively, the individual pouch cells have a moisture-tight pouch film.

In one preferred embodiment, the enclosure is a composite film comprising an aluminum. What is advantageous about aluminum is that aluminum is moisture-tight and thus constitutes a moisture barrier. Aluminum additionally affords the advantage that it is very light and cost-effective and moreover is available in large quantities. As an alternative thereto, steel or a coated plastic can be used. The coating is applied to the plastic for example by means of CVD (Chemical Vapor Deposition) or PVD (Physical Vapor Deposition), such that said plastic no longer allows moisture to pass through. As an alternative thereto, it is possible to use polyphenylene sulfide (PPS), a liquid crystal polymer or a block polymer, such as polynorbornene for example.

What is advantageous about a composite film as the enclosure is that different properties are imparted to the enclosure by the different layers of the composite film. It is advantageous, for example, if the aluminum layer does not constitute the outermost layer of the enclosure, rather the outermost layer is an electrically insulating layer, for example a polyolefin, in particular polyethylene and/or polypropylene.

What is advantageous here, for example, is that the battery cell system with voltage tap is already electrically insulated toward the outside, such that separate protection against electric shock no longer need be applied to the battery module. It is advantageous, in particular, if the aluminum layer is arranged centrally in the composite film since, in this way, no current-conducting components localized within the enclosure can make contact with the aluminum layer and the risk of a short circuit is thus eliminated. Furthermore, the battery module is already electrically insulated for example vis-à-vis a cooling plate by the enclosure in the form of the composite film if the cooling plate is situated outside the enclosure. What is advantageous here is that the air gap between the battery module and the cooling plate does not have to be filled by means of a thermally conductive paste or thermally conductive film, rather the thermal contact area is already insulated by the outermost, electrically insulating layer of the enclosure.

In one preferred embodiment, the enclosure bears against the battery cell system with voltage tap on account of a reduced pressure generated, in particular on account of a vacuum generated. What is advantageous here is that an enclosure that bears without an air gap and thus very closely imparts a certain stiffness and strength to the battery cell system with voltage tap, such that slipping of the components within the enclosure is greatly reduced, which improves the functionality and increases the lifetime of the battery, and also the safety of the battery. Furthermore, space is saved within the battery module.

In one embodiment, the enclosure adheres to the battery cell system by means of an adhesive. What is advantageous here is that the adhesive additionally has a sealing effect.

In one preferred embodiment, the enclosure is a shrink film. What is advantageous here is that the enclosure thus bears very closely against the battery cell system with voltage tap, as a result of which a certain stiffness and strength are imparted thereto, such that slipping of the components within the enclosure is reduced, which improves the functionality and increases the lifetime of the battery and also the safety of the battery.

In one advantageous embodiment, the enclosure comprises a drying agent. The latter imparts additional moisture tightness to the enclosure and is greatly advantageous primarily in the case of damage to the enclosure, for example in the form of a crack, since penetrating moisture is absorbed by the drying agent. Moreover, moisture diffusing into the enclosure is absorbed by the drying agent. This lengthens the lifetime of the battery module.

In one particularly preferred embodiment, ends of the enclosure are sealed or welded to one another for sealing purposes. What is advantageous about sealing by means of the ends of the enclosure being sealed to one another is that a tight, materially bonded and force-locking loadable connection is present between them. What is advantageous about ends of the enclosure that are welded to one another is that exact weld seams having very high quality are present.

The term electrode composite should be understood to mean a composite comprising at least one anode and at least one cathode which can reversibly store and withdraw lithium ions.

During the charging of lithium-ion cells, lithium ions migrate from the cathode through the electrolyte to the anode and are stored in the latter. At the same time, electrons likewise migrate from the cathode to the anode via an external circuit. During the discharging of lithium-ion cells, these processes proceed in the opposite direction, such that lithium ions migrate from the anode to the cathode and are stored there in the latter.

Furthermore, the electrode composite comprises at least one separator that both spatially separates and electrically isolates the anode and the cathode from one another. The anode, the separator and the cathode can be wound up in one another or be present in a manner stacked one on top of another.

The cathode comprises a cathode carrier film, for example, which is embodied as electrically conducive and comprises an aluminum, for example. The cathode active material, for example a combination of different lithium metal oxides LiMeO, is at least partly applied to the cathode carrier film. Alternatively, the cathode active material comprises a non-oxidic material. An edge strip of the cathode carrier film is not coated with active material, for example, from which one or more cathode contact lugs serving for electrically contacting the cathode are then cut out, for example.

The anode comprises an anode carrier film, for example, which is embodied as electrically conductive and comprises copper, for example. The anode active material is at least partly applied to the anode carrier film. The anode active material comprises for example a natural and/or synthetic graphite, silicon and/or a titanate. An edge strip of the anode carrier film is not coated with active material, for example, from which one or more anode contact lugs serving for electrically contacting the anode are then cut out, for example.

In one advantageous embodiment, the pouch film has a length L and a width B, wherein the length L is in particular longer than the width B. The pouch film is folded over along the longitudinal extent, such that two pouch film halves arranged one on top of the other are present. This results in an open end and a closed end resulting from the pouch film being folded over. The pouch film halves are joined together in accordance with their width at, in particular regular, intervals in such a way that pockets spatially separated from one another are present.

What is advantageous here is that the closed ends of the pouch film halves do not have to be joined together since they are already linked. It is additionally advantageous that the pouch film is linked at one piece and it is not necessary to devote attention to individual parts when folding over one pouch film half or when joining together the pouch film halves in accordance with their width. As a result, the assembly of the linked pouch film with pockets can be realized very simply and rapidly.

A further advantage is that the pouch film is handleable as a pouch film strip in a manufacturing machine and can thus be transported very simply by means of conveyor belts and rollers in comparison with individual parts that are handleable in a complex fashion.

In an alternative embodiment, the pouch film halves are joined together in accordance with their width at irregular intervals. This may be advantageous for example when subsequently folding the individual pouch cells linked by the pouch film.

In one advantageous embodiment, the pockets of the pouch film are at least partly closed in accordance with their length at the open end thereof by the two pouch film halves being joined together. What is advantageous here is that this gives rise to a space sealed at least for electrolyte within the pocket, the electrolyte being filled or introduced into said space, for example. The pockets of the pouch film are then for example also protected against contaminations, for example particles, since the latter cannot pass through the sealed pouch film.

In one particularly preferred embodiment, the joining together of the pouch film halves is implemented in the form of seams, in particular sealing seams. In this case, seams that separate the pockets from one another in accordance with their width are transverse seams, and the seam that closes the pockets in accordance with their length is a longitudinal seam.

What is advantageous here is that the seams, on the one hand, are likewise flexible and extendible to a certain degree, for example, but nevertheless fixedly hold together the pouch film halves.

An anode contact lug of an anode and a cathode contact lug of the cathode serve for electrically contacting the pouch cell. In one particularly preferred embodiment, at least one anode contact lug of an anode of the electrode composite and at least one cathode contact lug of a cathode of the electrode composite, on the same side of the pocket, in particular in a manner offset with respect to one another, project beyond the pocket. What is advantageous here is that the contact lugs thus face away from the pouch film, with the result that there is enough space for the electrical contacting of the anode contact lug and the cathode contact lug. The electrode composites have for example long and short side lengths. The contact lugs project for example beyond one of the long side lengths. Alternatively, the contact lugs project beyond one of the short side lengths.

Alternatively, at least one anode contact lug of an anode of the electrode composite and at least one cathode contact lug of a cathode of the electrode composite, on mutually opposite sides of the pocket, project beyond the pocket. That is to say that the contact lugs project beyond mutually opposite short or long side lengths.

What is advantageous here is that for the electrodes the current flow is very homogeneous in comparison with electrodes having both contact lugs on the same side. Furthermore, in a continuous design one contact lug can be utilized jointly by two cells.

In a first embodiment, the pouch film and in particular the enclosure are folded in each case between the interlinked pouch cells arranged in the battery module, in particular in a zigzag fold, such that for example the pouch film and the enclosure have a fold in each case parallel to one another. Alternatively, it is possible for only the pouch film to have a fold, in particular after each pouch cell, the enclosure not having a fold.

The fold is effected for example at regular intervals, for example after each pouch cell. Alternatively, the fold is not effected at regular intervals. What is advantageous here is that the battery module is configurable very flexibly by virtue of the folds, for example with regard to space requirement, shape or size of the battery module, folding techniques and contacting possibilities both for the individual pouch cells and for the battery module.

In an alternative second embodiment, the contact lugs of in each case two pouch cells of the same battery cell system, said pouch cells being situated alongside one another, face toward one another and are electrically connected to one another. In this case, the pouch film has a fold for example after each pouch cell of the battery system, such that the folded battery cell system is reminiscent of a zigzag shape or S-shape. The enclosure of the battery module has a fold for example likewise after each pouch cell of the battery system. What is advantageous here is that, as a result of the folds, space can be saved in the battery module and/or the battery cell system can be adapted to the shape of a module housing or battery housing.

In a third embodiment, the battery module comprises at least a first and a second battery cell system each having interlinked pouch cells situated alongside one another. The battery cell systems are arranged opposite one another, which means that the contact lugs of the battery cell systems respectively face toward one another. In this case, a respective anode contact lug of the first battery cell system is electrically contacted with a cathode contact lug of the second battery cell system situated opposite, and a respective anode contact lug of the second battery cell system is electrically contacted with a cathode contact lug of the first battery cell system situated opposite. What is advantageous here is that the contact lugs respectively project beyond the pouch films and face away from the latter, such that the voltage tap can be arranged on the contact lugs at a right angle with respect to the direction in which the contact lugs extend. Upon the electrical contacting of the contact lugs at the current tap, the pouch film is thus spaced apart and there is enough space, moreover, such that the contacting can be carried out simply and rapidly.

The first battery cell system and the second battery cell system are folded for example in such a way that the anode contact lugs and the cathode contact lugs of the electrode composites of the battery cell systems and the voltage tap face upward and those sides of the electrode composites of the battery cell systems which are situated respectively opposite the contact lugs are folded downward toward one another. What is advantageous here is that the folding of said sides results in the spatial extent of the battery cell systems being substantially halved, as a result of which the outwardly facing surface areas of the battery cell systems are substantially halved. As a result, for example, space can be saved in the battery module and/or the battery cell systems can be adapted to the shape of a module housing or battery housing.

In one embodiment, the battery module comprises at least one L-shaped cooling plate. The cooling plate is arranged for example in an interspace between the folded pouch cells, such that the cooling plate bears against outer surfaces of the pouch cells. An L-shaped cooling plate is arranged in particular after each fold or after every second fold of the pouch cells.

The L-shaped cooling plate accepts the thermal energy from the pouch cell by means of the larger surface of said cooling plate and transfers said heat to the smaller surface of said cooling plate. This has the advantage that the heat is thus transferred from the pouch cells to a common plane formed in particular from all the smaller surfaces of the cooling plates that respectively bear against a smaller surface of the pouch cells. The smaller surface is taken to mean for example an underside, a top side or one of the smaller side faces of the pouch cells. In this way, instead of many cooling units between the pouch cells only a single planar cooling unit, in particular a cooling sheet, is required, which is arranged at the smaller surfaces of the cooling plates. Alternatively, the battery module comprises further cooling units. A cooling unit is a structure through which coolant or refrigerant flows and which can transfer thermal energy from the surface to the agent used.

In an alternative embodiment, the cooling plate has a U-shape, such that the cooling plate bears against three outer surfaces of the pouch cell.

The cooling plates are situated within the enclosure, for example. What is advantageous here is that the enclosure can thus be made smaller, such that it encloses the battery module in a cubic or parallelepipedal shape, for example, and does not have to be folded between the individual pouch cells. Furthermore, the customarily used electrical insulation of the cooling unit with respect to the plates can be omitted if the outer layer of the composite of the enclosure is embodied in an electrically insulating fashion.

Alternatively, the at least one cooling plate is arranged outside the enclosure.

The cooling plates comprise for example aluminum, carbon or copper, in particular an aluminum plate, an aluminum film. Aluminum affords the advantage that it is light and cost-effective and moreover is available in large quantities.

Furthermore, it is possible to introduce mineral papers as a barrier between the pouch cells alongside the cooling plates or else into the cell interspaces without cooling plates. In the event of self-heating of a pouch cell, said mineral papers prevent the cell adjacent to said pouch cell from exceeding a critical temperature and thus also transitioning to self-heating. Furthermore, the mineral paper for example also protects the pouch films of adjacent pouch cells such that the latter are still electrically insulating and hence no electrical short circuit occurs at the neighboring pouch cell.

In a further embodiment, a short-circuiting circuit is integrated into the battery module, said circuit being arranged for example at the contact lugs of the electrode composites of the battery cell system and deactivating the respective pouch cell in the case of a fault.

Furthermore, a method for producing a battery module comprising at least one battery cell system is disclosed. A movement-flexible enclosure constituting in particular a hermetic moisture barrier is fitted around the entire battery cell system and around the voltage tap of the battery module, in particular by sealing, adhesive bonding and/or shrink fitting of the enclosure.

The sealing method is for example a thermal sealing method or an ultrasonic sealing method. What is advantageous about sealing is that a tight connection arises. What is advantageous about an adhesive bonding method is that the adhesive additionally has a sealing effect. What is advantageous about shrink fitting of the enclosure is that the enclosure bears very closely against the battery cell system with the voltage tap, as a result of which a certain strength is imparted thereto, such that slipping of the components within the enclosure is reduced.

In one embodiment, a battery module in accordance with the third embodiment is disclosed which comprises four battery cell systems. The first and second battery cell systems are physically connected to the third and fourth battery cell systems via a flexible cell connector. Furthermore, for example the third and fourth battery cell systems are folded about a vertical axis at the flexible cell connector, such that the first battery cell system and the third battery cell system bear against one another.

As a result, the outwardly facing surface areas are reduced, as a result of which space can be saved in the battery module and/or as a result of which the battery cell systems can be adapted to the shape of a module housing or battery housing.

Moreover, the invention discloses a battery comprising a battery module according to the invention, and the use thereof in an electric vehicle, in a hybrid vehicle or a in plug-in hybrid vehicle. Alternatively, the battery finds application for example in ships, two-wheeled vehicles, aircraft, stationary energy stores, electric tools, consumer electronics and/or domestic appliances.

BRIEF DESCRIPTION OF THE DRAWINGS

Embodiments of the present invention are illustrated in the drawing and are explained in greater detail in the following description of the figures, in which:

FIG. 5: shows schematically steps AA through EE of the assembly of a battery module according to the invention in a third embodiment with two battery cell systems in accordance with FIG. 1a, FIG. 6a: shows a schematic illustration of a battery module according to the invention in a fourth embodiment with four battery cell systems, FIG. 8: shows a schematic illustration of a plan view of a continuous production line for fitting the enclosure around battery modules in accordance with FIGS. 5, 6 and 7, FIG. 9a: shows a schematic illustration of a frontal view of the production line in accordance with FIG. 8, and FIG. 9b: shows a schematic illustration of a lateral view of a sequence of steps along the sectional edge K-K' in accordance with FIG. 9a.

DETAILED DESCRIPTION

Figure 1A:
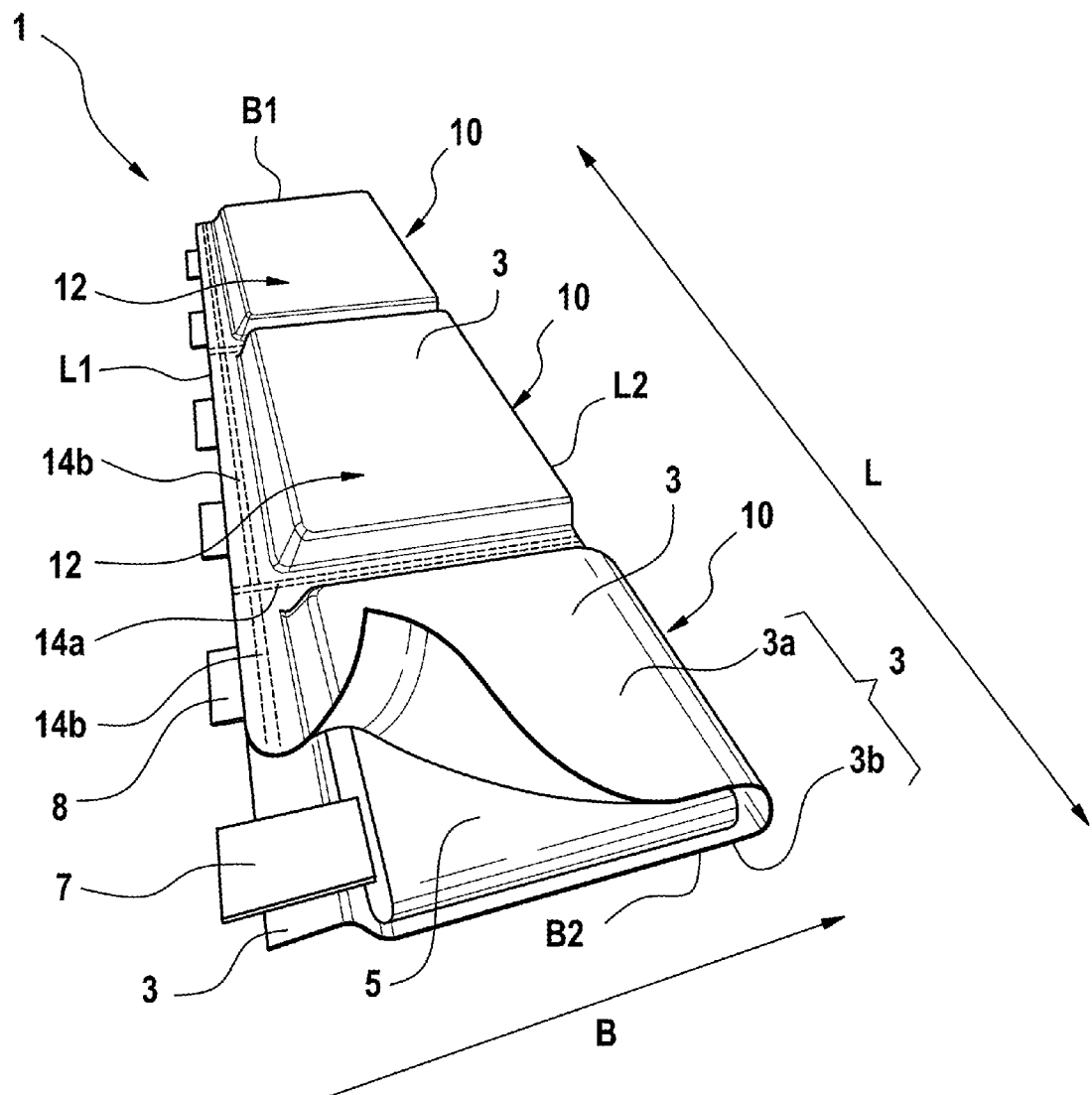
FIG. 1a: shows a schematic illustration of a 3D view of a first variant of a battery cell system of a battery module according to the invention.

FIG. 1a illustrates a first variant of a battery cell system 1. The battery cell system 1 comprises a pouch film 3 and three electrode composites 5. The three electrode composites 5 represent by way of example an arbitrary number of electrode composites 5.

The pouch film 3 has a length L and a width B, wherein the length L is longer than the width B. Furthermore, the pouch film 3 has a first side length L1 and a second side length L2 situated opposite the latter, and also a first side width B1 and a second side width B2 situated opposite the latter. The pouch film 3 forms pockets 12 which are separated from one another and which are connected to one another in a foldable manner. The pouch film 3 is electrolyte-impermeable.

Each electrode composite comprises an anode having an anode contact lug 7, a separator and a cathode having a cathode contact lug 8, which are present in a manner stacked one on top of another. In an alternative embodiment (not illustrated), an electrode composite 5 comprises a plurality of anodes and/or anode contact lugs 7 and a plurality of cathodes and/or cathode contact lugs 8. An electrode composite 5 is introduced into each pocket 12 of the pouch film 3 in such a way that the anode contact lug 7 and the cathode contact lug 8, in a manner offset with respect to one another, project beyond a first side length L1 of the pouch film 3.

A respective electrode composite 5 together with a pocket 12 of the pouch film 3 forms a pouch cell 10.

In one embodiment, the pouch film 3 comprises a moisture-permeable material. The pouch film 3 comprises for example a laminate comprising at least one plastic, in particular a polyolefin such as, for example, a polyethylene and/or a polypropylene. The pouch film 3 comprises for example no aluminum, in particular no metal. Alternatively, the individual pouch cells 10 have a moisture-tight pouch film 3. The pouch film 3 comprises for example a laminate comprising at least one plastic, in particular a polyolefin such as, for example, a polyethylene and/or a polypropylene and/or aluminum, in particular metal.

The pouch film 3 is folded over along the longitudinal extent, such that a first pouch film half 3a and a second pouch film half 3b are present. Transverse seams 14a are introduced into the pouch film halves 3a, 3b in accordance with their width B at, in particular regular, intervals, said transverse seams forming pockets 12 spatially separated from one another. The transverse seams 14a are introduced for example by the two pouch film halves 3a, 3b being sealed to one another. The pockets 12 of the pouch film 3 are closed in accordance with their length L by a longitudinal seam 14b, which is introduced for example by the pouch film halves 3a, 3b being sealed at the open end thereof. In this case, the anode contact lugs 7 and the cathode contact lugs 8 are also concomitantly sealed in a region in which said contact lugs bear against the pouch film halves 3a, 3b.

By way of example, an electrolyte, in particular a liquid electrolyte, is introduced into the pockets 12 of the pouch film 3, wherein the pockets 12 form a barrier to the electrolyte.

Figure 1B:
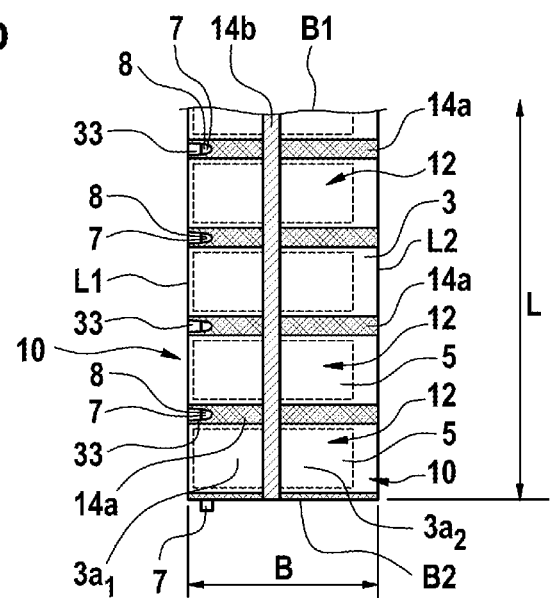
FIG. 1b: shows a schematic illustration of a plan view of an excerpt from a battery cell system of a battery module according to the invention in a second variant.

FIG. 1b illustrates a second variant of a battery cell system 1. The battery cell system 1 comprises a pouch film 3 and four electrode composites 5. The four electrode composites 5 represent by way of example any arbitrary number of electrode composites 5.

Only features that differ from the first variant of the battery cell system 1 as illustrated in FIG. 1a are mentioned below.

The electrode composites 5 are rotated by 90°, such that they are arranged alongside one another at their long electrode composite side widths. The anode contact lugs 7 and the cathode contact lugs 8 of the electrode composites 5 are arranged on mutually opposite sides of the electrode composites 5.

A respective anode contact lug 7 of an electrode composite 5 is electrically contacted with a respective cathode contact lug 8 of an adjacent electrode composite 5. The contacting is effected for example by welding, in particular by laser welding, or by roll bonding.

The pouch film 3 is folded over in accordance with its length L at the first side length L1 and at the second side length L2, in the direction of the electrode composites 5. The pouch film 3 thus forms a kind of indentation, within which the electrode composites 5 are situated. In this case, the two folded-over pouch film pieces $3a_1$, $3a_2$ overlap in a region situated in particular centrally with respect to the pouch film 3 and are joined together, in particular sealed, in accordance with the length L, such that a continuous central longitudinal seam 14b is formed and the pockets 12 are sealed in particular completely. Alternatively, the longitudinal seam 14b is arranged at any other location desired.

The pouch film 3 has cutouts 33, which are formed in a semicircular fashion, for example. Alternatively, the cutouts 33 can also have any other shape desired.

The cutouts 33 of the pouch film 3 lie on the interconnected anode contact lugs 7 and cathode contact lugs 8 after the pouch film pieces $3a_1$, $3a_2$ have been folded over. Through the cutouts 33 a direct contact with the anode contact lugs 7 and cathode contact lugs 8 is possible, such that these can be contacted. The transverse seams 14a extend around the cutouts 33, such that the latter are likewise sealed and thus tight.

Figure 1C:
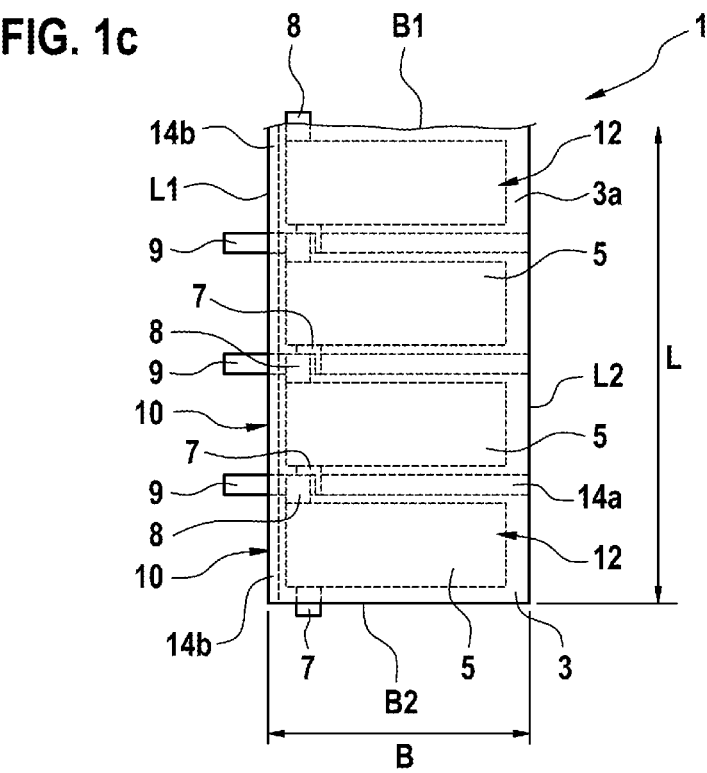
FIG. 1c: shows a schematic illustration of a plan view of an excerpt from a battery cell system of a battery module according to the invention in a third variant.

FIG. 1c illustrates a third variant of a battery cell system 1. In contrast to the first embodiment of the battery cell system 1 as illustrated in FIG. 1a, the electrode composites 5 are rotated by 90°, such that they are arranged alongside one another at their long electrode composite side widths. The anode contact lugs 7 and the cathode contact lugs 8 of the electrode composites 5 are arranged on mutually opposite of the electrode composite 5. The anode contact lug 7 of an electrode composite 5 is contacted at a low-current tab 9, and the cathode contact lug 8 of an adjacent electrode composite 5 is contacted at the same low-current tab 9. The low-current tab 9 is arranged such that it projects beyond a first side length L1 of the pouch film 3. The low-current tab 9 is used for the voltage tap of the anode contact lug 7 and the cathode contact lug 8. The anode contact lugs 7 and the cathode contact lugs 8 are situated in the transverse seam 14a of the pouch film 3, such that these are at least partly concomitantly sealed, for example. The low-current tab 9 is concomitantly sealed by the longitudinal seam 14b in a region in which said tab bears against the pouch film halves 3a, 3b.

In each of the variants of the battery cell systems 1 as illustrated in FIGS. 1a-1c, the electrode composites 5 can also be rotated by 90°, wherein the contact lugs 7, 8 maintain their alignment and are present in the manner as illustrated in FIGS. 1a-1c.

Figure 2:
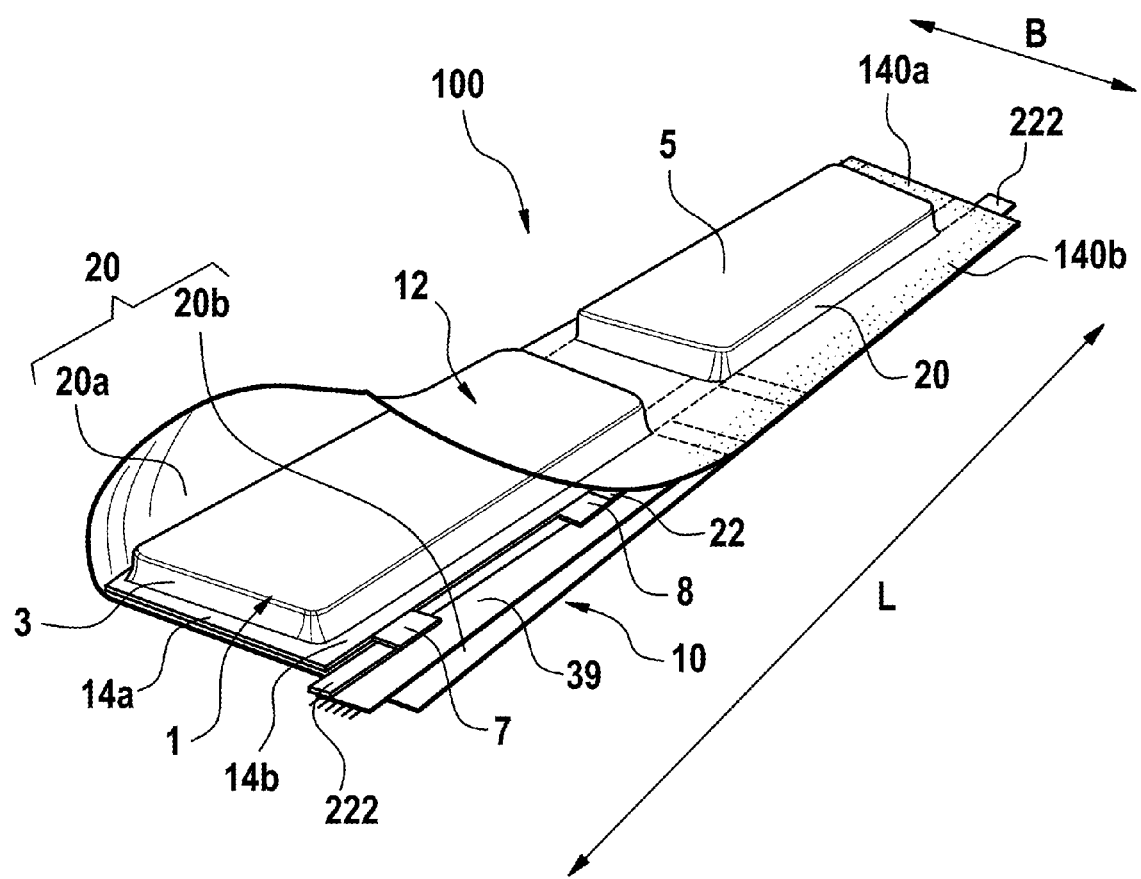
FIG. 2: shows a schematic 3D illustration of a battery module according to the invention in a first embodiment having an enclosure, which encloses a battery cell system in accordance with FIG. 1a, FIG. 3: shows schematically steps A through E from the production and folding of a battery module in accordance with FIG. 2 to integration into a housing.

FIG. 2 illustrates a first embodiment of a battery module 100 according to the invention. The battery module 100 comprises a battery cell system 1 in accordance with FIG. 1a, said battery cell system having two pouch cells 10. The two pouch cells 10 represent by way of example any arbitrary number of pouch cells 10. The pouch cells 10 are surrounded by an electrolyte-impermeable pouch film 3. The battery module 100 comprises a movement-flexible enclosure 20 constituting a hermetic moisture barrier in one embodiment. In an alternative embodiment, the enclosure is embodied in a moisture-permeable manner.

The enclosure 20 encloses the entire battery cell system 1 and also a voltage tap embodied in the form of balancing lines 39, which tap the voltage of the pouch cells 10 of the battery cell system 1. The cell monitoring system CSC, which is electrically contacted by the balancing lines 39, is not illustrated in FIG. 2. Furthermore, the cathode contact lug 8 of one pouch cell 10 and the anode contact lug of the other pouch cell 10 are electrically connected to one another via a cell connector 22. Only the cathode contact lug 8 and part of the cell connector 22 are visible in FIG. 2.

The cell connectors 22 of the outer contact lugs 7, 8 of the outer pouch cells 10 of the battery module 100 are embodied in the form of module connectors 222, via which an electrical connection to a next battery module 100 or to an input and/or output of a battery pack and/or a battery can be produced.

In the present invention, a battery pack should be understood to mean a unit comprising at least two battery modules 100. A battery can comprise just one battery module 100 or alternatively one or a plurality of battery packs.

The cell connectors 22 and the module connectors 222 are fitted on balancing lines 39 embodied for example in the form of ribbon cables. Alternatively or additionally, the contact lugs 7, 8 are fitted on the balancing lines 39. The balancing lines 39 are welded onto the contact lugs 7, 8, for example. They are connected to a cell monitoring system CSC and thus ensure a uniform voltage of all the pouch cells 10 within the battery module 100.

The pouch cells 10 are connected in series with one another, for example. The enclosure 20 is folded over in accordance with its length L in the direction of the battery cell system 1, such that a first enclosure half 20a and a second enclosure half 20b are present. The open ends of the enclosure 20 are connected to one another, in particular sealed or welded to one another, in accordance with the length L thereof and the width B thereof for sealing purposes, such that module longitudinal seams 140b and module transverse seams 140a are formed. In this case, the module connectors 222, and for example the balancing lines 39, are also concomitantly sealed or concomitantly welded in a region in which they bear against the ends of the pouch film halves 3a, 3b.

The enclosure 20 bears against the battery cell system 1 with the voltage tap for example on account of a reduced pressure generated, in particular on account of a vacuum generated. Alternatively or additionally, the enclosure adheres to the battery cell system 1 for example by means of an adhesive. Alternative or additionally, the enclosure 20 is for example a shrink film. The enclosure comprises a drying element, for example.

Figure 3:
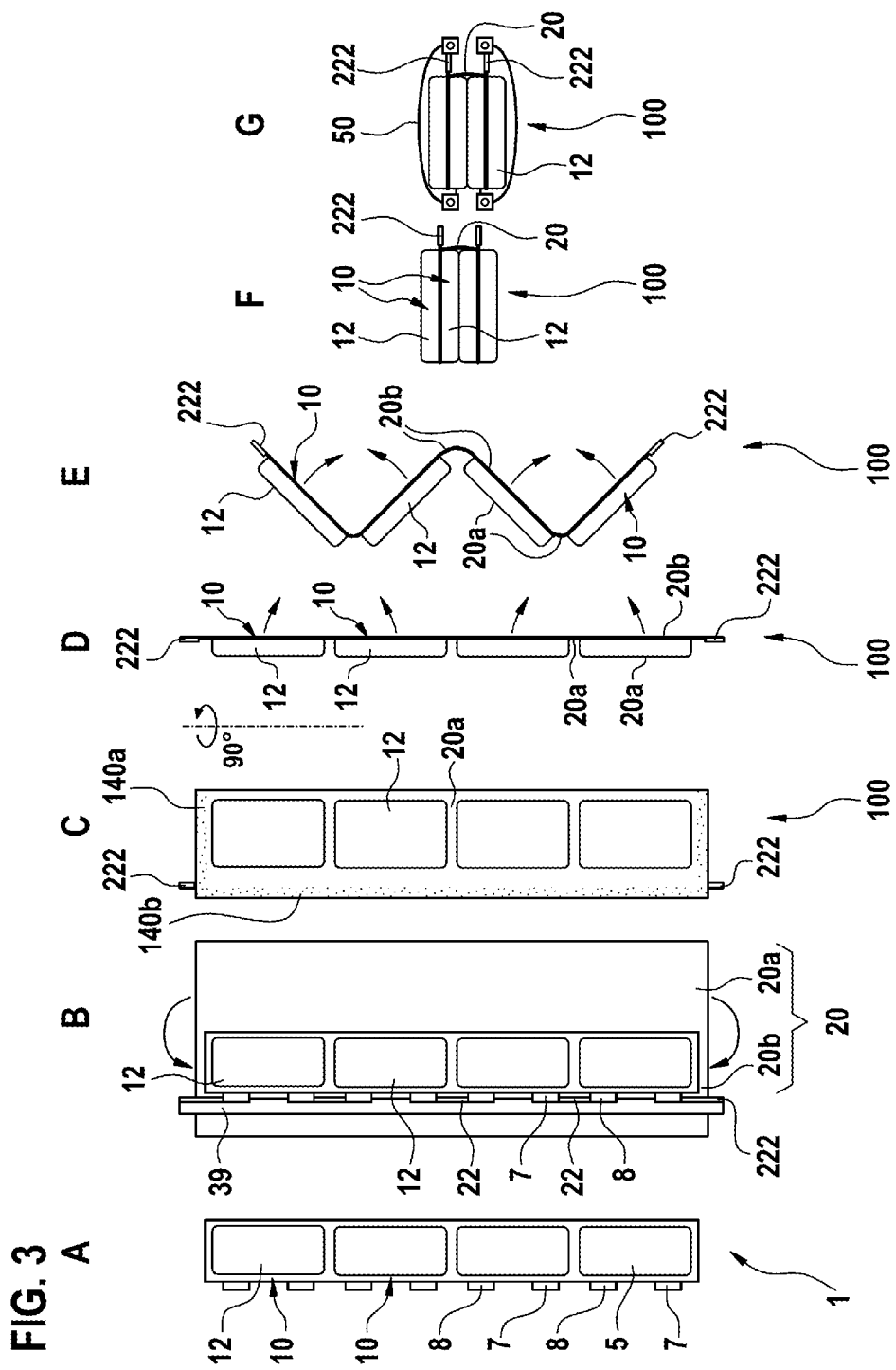

FIG. 3 illustrates steps A-G for producing, folding and integrating the battery module in accordance with FIG. 2 into a module housing. For the sake of completeness, steps A-C are illustrated, even though they have already been described in the description concerning FIG. 2. Once the enclosure 20 has been placed around the battery cell system 1 and the voltage tap thereof and surrounds them in particular in a moisture-tight manner as a result of the sealing or welding of the open ends of the enclosure 20, the battery module 100 is folded. FIG. 5 illustrates the depictions D-G in a lateral view rotated by 90°. In step D, the battery module 100 is arranged in accordance with its length. The pouch cells 10 stand out from the regions connecting them, comprising the pouch film 3 and the enclosure 20. The folding of the battery module 100 is illustrated in step E. In this case, the enclosure 20 and the pouch film 3 are folded with a zigzag fold in each case between the interlinked pouch cells 10 arranged in the battery module 100, such that a fold is present after each pouch cell 10. Alternatively, a fold is not present after each pouch cell 10, but rather in each case after an arbitrary number of pouch cells 10. In step F, the battery module 100 is completely folded, such that the pouch cells 10 are present in a manner stacked one on top of another. The module connectors 222 each face in the same direction. Depending on a number of pouch cells 10 in the battery module 100, the module connectors 222 face in mutually opposite directions. In step G, the folded battery modules 100 are introduced into a battery housing 50. In this case, the module connectors 222 are electrically conductively connected to an electrical terminal of the battery housing 50.

Figure 4:
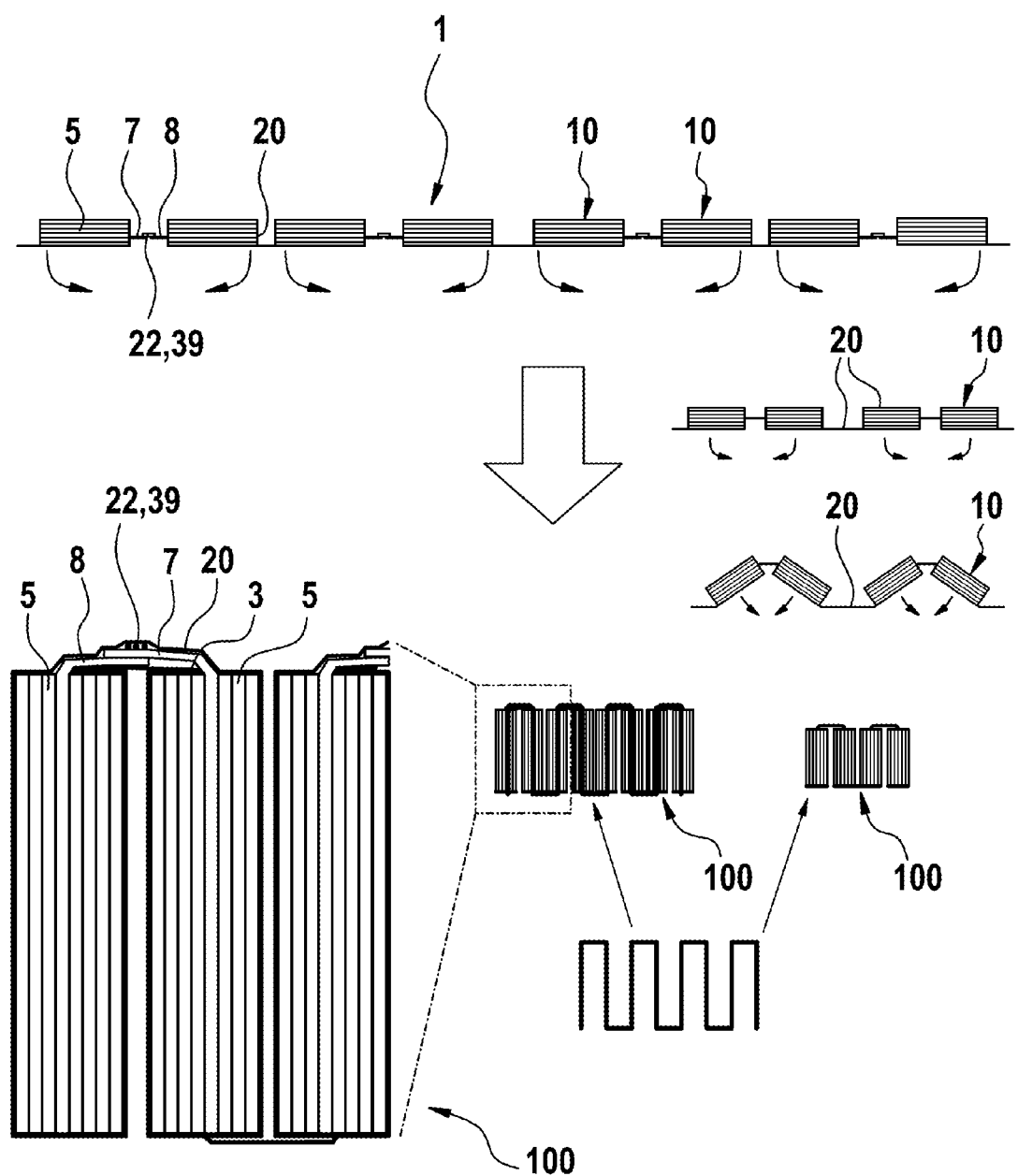
FIG. 4: shows a schematic illustration of a vertical section through a battery module according to the invention in a second embodiment with an enclosure, which encloses a battery cell system.

FIG. 4 illustrates a vertical section through pouch cells 10 of a battery cell system 1 of a battery module 100 according to the invention in a second embodiment. The number of illustrated pouch cells 10 of the battery module 100 represents by way of example any arbitrary number of pouch cells 10. The pouch cells 10 are surrounded by a pouch film 3, which can be seen in the enlarged illustration at the bottom left. The battery module 100 comprises a movement-flexible enclosure 20 constituting a hermetic moisture barrier. The enclosure 20 encloses the entire battery cell system 1 and also a voltage tap embodied for example in the form of balancing lines 39, which contact the anode contact lugs 7 and the cathode contact lugs 8 of the battery cell system 1. In an additional or alternative embodiment, the balancing lines 39 are electrically conductively connected to a cell connector 22.

Two adjacent pouch cells 10 of the battery cell system 1 respectively face toward one another with their contact lugs 7, 8 and are electrically contacted with one another. The battery cell system 1 is folded such that the sides of the pouch cells 10 at which the contact lugs 7, 8 are arranged are folded upward and the sides of the pouch cells 10 which are situated opposite to the contact lugs 7, 8 are folded downward. In this way, the contact lugs 7, 8 of all the pouch cells 10 are arranged on a top side. The fold is effected in each case between the pouch cells 10, such that the pouch film 3 and the enclosure 20 of the battery module 100 have a fold after each pouch cell 10 of the battery system 1.

The pouch cells 10 are interconnected in parallel with one another, for example. Alternatively, the pouch cells 10 are connected in series. In this case, by way of example, cell connectors 22 electrically link the anode contact lugs 7 to the cathode contact lugs 8. In the case of the first and last pouch cells 10, for example a module connector, for example in the form of an anode contact lug or a cathode contact lug, produces an electrical connection to the battery pack or to the battery.

FIG. 5 illustrates the assembly of a battery module 100 according to the invention in a third embodiment. The battery module 100 comprises two battery cell systems 1 in accordance with FIG. 1a.

In step AA, firstly a first battery cell system 1a is provided. In step BB, a second battery cell system 1b is arranged alongside the first battery cell system 1a such that the contact lugs 7, 8 of the two battery cell systems 1a, 1b face toward one another. In this case, the pouch cells 10 of the first battery cell system 1a are situated in a manner slightly offset with respect to the pouch cells 10 of the second battery cell system 1b. Afterward, a respective cathode contact lug 8 of a first pouch cell 10a of a first battery cell system 1a is electrically contacted with an anode contact lug 7 of a first pouch cell 10a of a second battery cell system 1b. The anode contact lug 7 of the first pouch cell 10a of the first battery cell system 1a is in turn electrically contacted with the cathode contact lug 8 of the second pouch cell 10b of the second battery cell system 1b. All the contact lugs 7, 8 of the battery cell systems 1a, 1b are electrically connected to one another in this way. The electrical contacting is effected for example by welding, in particular laser welding or resistance welding. In a variant that is not illustrated in FIG. 5, cell connectors can also be used for the electrical connection of the contact lugs 7, 8 of the two battery cell systems 1. In one preferred embodiment, the pouch cells 10 are pushed together or folded in for example at their transverse seams 14a, in step BB along the arrow direction indicated in step AA, such that the battery cell system 1 occupies less space.

In step CC, balancing lines 39, for example in the form of ribbon cables, are fitted to each pair of contact lugs electrically connected to one another. The balancing lines 39 are welded onto the contact lugs 7, 8, for example. They are connected to the cell monitoring system CSC. A possible next step DD is already indicated by means of arrows in the figure concerning step CC. The connection channel 46, comprising the contact lugs 7, 8, possible cell connectors and the balancing lines 39, is folded between the interconnected battery cell systems 1a, 1b, such that these can scarcely be seen any more from above, as illustrated in step DD. Furthermore, the balancing lines 39 are connected to the cell monitoring system 53, and the cell monitoring system CSC is also folded onto the pouch cells 10. A space-optimized battery module 100 is obtained in this way. The steps described in the figure concerning step DD are optional. In step EE, an enclosure 20 is then fitted around the battery module 100, which encloses the latter, in particular in a moisture-tight manner. For this purpose, the enclosure 20 is placed for example around the battery module 100 and the two ends of the enclosure 20, as illustrated in step EE, are folded upward. Finally, the open ends of the enclosure 20 are connected to one another.

Figure 6A:
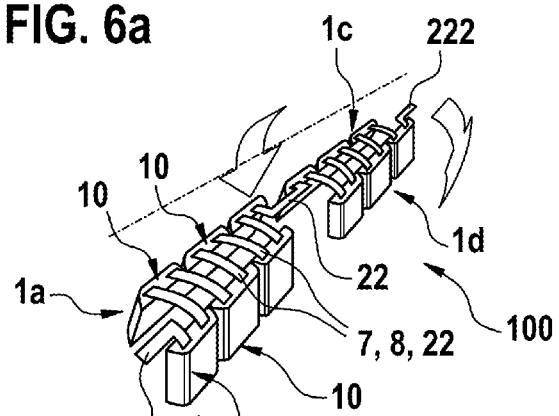
FIG. 6b: shows a schematic illustration of the battery cell systems in accordance with FIG. 6a, said battery cell systems having been folded to form a battery module.

FIG. 6a illustrates a battery module 100 according to the invention in a fourth embodiment. The battery module 100 comprises a first battery cell system 1a, a second battery cell system 1b, a third battery cell system 1c and a fourth battery cell system 1d according to the battery cell system 1 in FIG. 1a. The first and second battery cell systems 1a, 1b are connected to one another in accordance with FIG. 5 and the third and fourth battery cell systems 1c, 1d are likewise connected to one another in accordance with FIG. 5. The first and second battery cell systems 1a, 1b and the third and fourth battery cell systems 1c, 1d are folded in such a way that the anode contact lugs 7 and the cathode contact lugs 8 of the pouch cells 10 and also the voltage tap (not illustrated in FIG. 8a) face upward and those sides of the pouch cells 10 of the battery cell systems 1a, 1b, 1c, 1d which are respectively situated opposite the contact lugs 7, 8 are folded downward toward one another.

The first and second battery cell systems 1a, 1b are physically connected to the third and fourth battery cell systems 1c, 1d via a flexible cell connector 22. For this purpose, the flexible cell connector 22 is fitted in each case on a contact lug 7, 8 of one of the outermost pouch cells 10 of the battery cell systems 1a and 1c. The flexible cell connector 22 is for example an elongated cell connector 22. On the respective other side of the battery cell systems 1b and 1d, remote from the flexible cell connector 22, a respective module connector 222 is fitted on the outermost contact lug 7, 8 of the second battery cell system 1b and of the fourth battery cell system 1d. An enclosure 20 (not illustrated) is fitted around the battery cell systems 1a, 1b, 1c and 1d, in particular after folding in accordance with FIG. 6b. Only the module connectors 222 project for example from the enclosure.

In an alternative embodiment, the battery cell systems 1a and 1b form a first battery module and the battery cell systems 1c and 1d form a second battery module. A separate enclosure 20 in accordance with FIG. 5 is fitted around each of the battery modules. Only the module connectors 222 and the flexible cell connector 22 project for example from the enclosure 20.

Figure 6B:
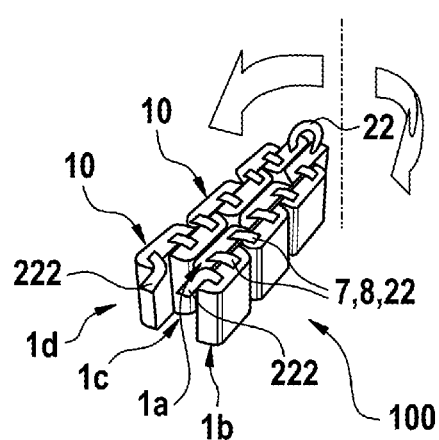

In FIG. 6b, the battery cell systems 1a, 1b, 1c, 1d in accordance with FIG. 6a are present in a folded state. The battery cell systems 1c and 1d are folded about a vertical axis at the flexible cell connector 22, such that the first battery cell system 1a and the third battery cell system 1c bear against one another. An enclosure 20 (not illustrated) is fitted around the battery cell systems 1a, 1b, 1c and 1d. Only the module connectors 222 project for example from the enclosure.

In an alternative embodiment, the battery cell systems 1a and 1b form a first battery module 100 and the battery cell systems 1c and 1d form a second battery module 100. A separate enclosure 20 in accordance with FIG. 5 is fitted around each of the battery modules 100. Only the module connectors 222 and the flexible cell connector 22 project for example from the enclosure.

Figure 7:
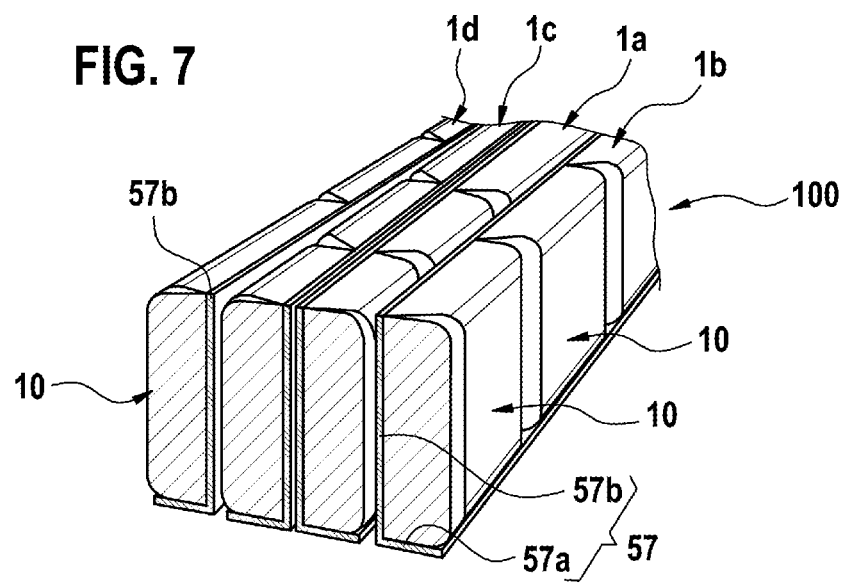
FIG. 7: shows a schematic illustration of a vertical section through two folded battery modules in accordance with FIG. 6b with L-shaped cooling plates.

FIG. 7 illustrates a battery module 100 in accordance with FIG. 6b. L-shaped cooling plates 57 having a large surface 57a and a small surface 57b angled by 90° are introduced into interspaces of the battery cell systems 1a, 1b, 1c, 1d that arose as a result of the folding. In the alternative embodiment described with respect to FIG. 6b, in which the enclosure 20 separately encloses in each case two battery cell systems 1a, 1b and 1c, 1d, the L-shaped cooling plates 57 are arranged for example outside the enclosure 20 between in each case two battery cell systems 1b, 1a and 1c, 1d, such that the larger, upwardly facing surface 57b of the cooling plates 57 adjoins the enclosure 20 on both sides and the smaller side surface 57a of the cooling plates 57 is arranged at the region of the enclosure 20 which encloses an underside of the pouch cells 10. Moreover, L-shaped cooling plates 57 are also arranged in the gap between the two battery modules 100.

In the embodiment in which the enclosure 20 encloses the battery cell systems 1a, 1b, 1c, 1d jointly, the L-shaped cooling plates 57 are arranged for example within the enclosure 20, such that they are situated between the pouch film 3 of the pouch cells 10 and the enclosure 20. The enclosure 20 is not illustrated in FIG. 7.

The arrangement of the L-shaped cooling plates 57 is illustrated by way of example in FIG. 7, alternatively, the number and the position of the L-shaped cooling plates 57 can vary. In one embodiment, by way of example, only a single L-shaped cooling plate 57 is arranged. The L-shaped cooling plates 57 comprise for example, aluminum, carbon or copper, in particular an aluminum plate or an aluminum film. In an alternative embodiment, the cooling plates 57 are not embodied in an L-shaped fashion, but rather in a U-shaped fashion.

FIG. 8 illustrates by way of example a continuous production line for fitting the enclosure 20 around battery modules 100, for example in accordance with FIGS. 5, 6 and 7, with a plurality of tracks. FIG. 8 illustrates a first battery module 100a, a second battery module 100b situated behind the latter, a third battery module 100c situated alongside the first battery module 100a, and a fourth battery module 100d situated behind the third battery module 100c. Part of the second battery module 100b is illustrated in an enlarged illustration. By way of example, space equal to a pouch cell length is left in each case between the first battery module 100a and the second battery module 100b and between the third battery module 100c and the fourth battery module 100d. Said space is used later for cutting the enclosure 20 between the individual battery modules 100a-100d and for example for fitting a printed circuit board (PCB). The battery modules 100a-100d and their voltage tap (not illustrated in FIG. 8) are already situated between the enclosure 20 in this production step. That is to say that the battery modules 100a-100d are already arranged on a first half of the enclosure 20 and a second half of the enclosure 20 already bears on the battery modules 100a-100d. For greater clarity of illustration, the enclosure 20 is not depicted in FIG. 8. The battery modules move in the production line in accordance with their length L. At the same time, the two halves of the enclosure are then joined together at the ends thereof and between the battery modules 100a-100d, for example by sealing or welding, in particular thermal contact welding and/or adhesive bonding, such that an, in particular moisture-impermeable, enclosure is fitted around each battery module 100a-100d. At the same time, at the connection channels 46, comprising the contact lugs 7, 8 and for example the cell connectors (not illustrated) and the balancing lines, a reduced pressure is applied, in particular a vacuum is established, such that the enclosure 20 is shrink-fitted onto the connection channels 46 and bears closely against them.

Figure 9A:
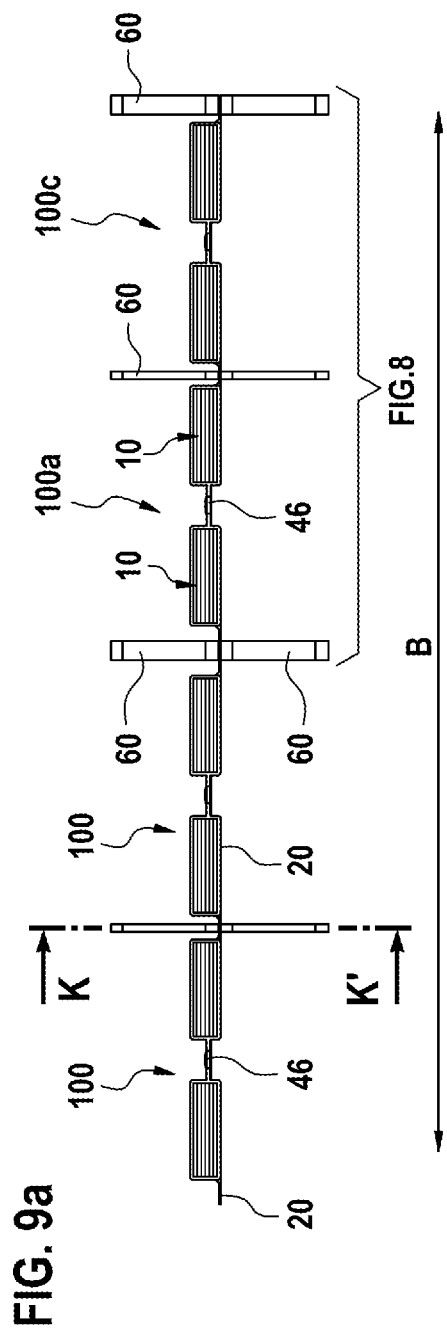

FIG. 9a illustrates a frontal view of the width B of the production line in accordance with FIG. 8. FIG. 9a illustrates by way of example a wider production line than in FIG. 8. In FIG. 9a, four battery modules 100, 100a, 100c are situated alongside one another. At the end of the battery module 100c and between the two battery modules 100c and 100a, and also between battery module 100c and a further battery module 100, and also between further battery modules 100, the layers of the enclosure 20 and the layers of pouch film 3 that are situated below them are sealed to one another. The sealing is effected by means of sealing rolls 60 performing continuous sealing. In the meantime, the enclosure 20 is shrink-fitted onto the connection channels 46. Alternatively, these steps can also proceed successively.

Figure 9B:
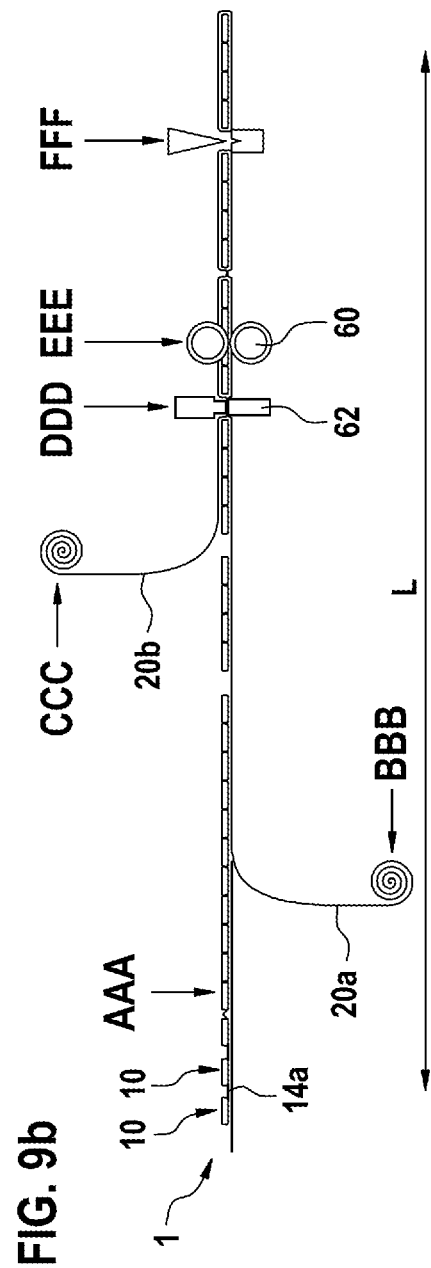

FIG. 9b illustrates a lateral view of a sequence of steps along the sectional edge K-K' of the production line in accordance with FIG. 9a. By way of example, continuous battery cell systems 1 are introduced into the production line. In a first step AAA, the pouch cells 10 of the battery cell system 1 which later form one of the battery modules 100 are pushed together, such that their transverse seams 14a are present in a folded-in manner. In this case, the pouch cells 10 can also be adhesively bonded to one another. In a second step BBB, a first enclosure half 20a is fed to the production line, the pouch cells 10 bearing on said first enclosure half. In a further step CCC, a second enclosure half 20b is fed to the production line, said second enclosure half bearing on the pouch cells 10. In a step DDD, the enclosure 20 is sealed between two battery modules 100 in accordance with the width by means of a sealing apparatus 62. In FIG. 8, this sealing seam corresponds to the sealing in accordance with the width B. In a step EEE, the enclosure 20 is sealed in accordance with the length L of the continuous battery cell system 1 by means of the sealing rolls 60 performing continuous sealing, such that a sealing seam is present between the later battery modules 100. In a step FFF, the enclosure 20 is cut in each case after a battery module 100, such that the individual battery modules 100 are no longer connected to one another via the enclosure 20 and a respective battery module 100 is surrounded by the, in particular moisture-impermeable, enclosure 20 tightly on all sides.

The invention claimed is:

1. A battery module (100) comprising at least one battery cell system (1) having at least two pouch cells (10), characterized in that the battery cell system (1) comprises a pouch film (3) and at least two electrode composites (5), wherein each of the electrode composites (5) comprises at least one anode and at least one cathode, and wherein the pouch film (3) forms pockets (12) separated from one another for containing respective ones of the electrode composites (5), such that each of the pockets (12) together with the respective one of the electrode composites (5) forms one of the pouch cells (10), wherein each of the pouch cells (10) also comprises an anode contact lug (7) and a cathode contact lug (8), and wherein the pockets (12) are connected to one another physically in a foldable manner via the pouch film (3), wherein the battery module (100) also comprises a cell monitoring system and a voltage tap connecting the cell monitoring system and at least one of the anode and cathode contact lugs (7, 8), wherein the battery module (100) has a movement-flexible, foldable enclosure (20), which encloses the entire battery cell system (1) and the voltage tap of the battery module (100), and wherein the voltage tap connects the cell monitoring system with at least one of the anode contact lugs and at least one of the cathode contact lugs.

2. The battery module (100) according to claim 1, characterized in that the enclosure (20) is a composite film comprising an aluminum.

3. The battery module (100) according to claim 1, characterized in that the enclosure (20) bears against the battery cell system (1) with the voltage tap as a result of a reduced pressure generated.

4. The battery module (100) according to claim 1, characterized in that the enclosure (20) adheres to the battery cell system (1) by means of an adhesive.

5. The battery module (100) according to claim 1, characterized in that the enclosure (20) is a shrink film.

6. The battery module (100) according to claim 1, characterized in that the enclosure (20) comprises a drying agent.

7. The battery module (100) according to claim 1, characterized in that ends of the enclosure (20) are sealed or welded to one another for sealing purposes.

8. The battery module (100) according to claim 1, characterized in that the anode contact lugs (7) and the cathode contact lugs (8) in each case on the same side of the pockets (12) of the pouch cells, or on mutually opposite sides of the pockets (12) of the pouch cells, project beyond the pocket (12).

9. The battery module (100) according to claim 1, characterized in that the pouch film (3) is folded in each case between the pouch cells (10) arranged in the battery module (100).

10. The battery module (100) according to claim 1, characterized in that the anode and cathode contact lugs (7, 8) of in each case two pouch cells (10) of the same battery cell system (1a, 1b), said pouch cells being situated alongside one another, face toward one another and are electrically connected to one another, and in that the pouch film (3) and has a fold after each pouch cell (10) of the battery system (1).

11. The battery module (100) according to claim 1, characterized in that the at least one battery cell system includes a first battery cell system and a second battery cell system and wherein one of the anode contact lugs (7) of the first battery cell system (1a) is electrically contacted with a cathode contact lug (8) of the second battery cell system (1b) situated opposite, and a respective anode contact lug (7) of the second battery cell system (1b) is electrically contacted with one of the cathode contact lugs (8) of the first battery cell system (1a) situated opposite.

12. The battery module (100) according to claim 11, characterized in that the first battery cell system (1a) and the second battery cell system (1b) are folded in such a way that the anode contact lugs (7) and the cathode contact lugs (8) and the voltage tap face upward and sides of the electrode composites (5) of the first and second battery cell systems (1a, 1b) which are situated respectively opposite the anode and cathode contact lugs (7, 8) are folded downward toward one another.

13. The battery module (100) according to claim 1 wherein the at least one battery cell system includes at least four battery cell systems (1a, 1b, 1c, 1d), characterized in that the first and second battery cell systems (1a, 1b) are physically connected to the third and fourth battery cell systems (1c, 1d) via a flexible cell connector (22).

14. The battery module according to claim 13, characterized in that the third and fourth battery cell systems (1c, 1d) are folded about a vertical axis at the flexible cell connector (22), such that the first battery cell system (1a) and the third battery cell system (1c) bear against one another.

15. The battery module (100) according to claim 1, characterized in that the battery module (100) comprises at least one L-shaped cooling plate (57).

16. The battery module (100) according to claim 15, characterized in that the L-shaped, cooling plate (57) comprises an aluminum, a carbon and/or a copper.

17. A method for producing a battery module according to claim 1 comprising at least one battery cell system (1), wherein a movement-flexible enclosure (20) is fitted around the at least one battery cell system (1) and around the voltage tap (22) of the battery module (100).

18. The battery module (100) according to claim 1, wherein the pouch film (3) forms pockets (12) separated from one another and situated alongside one another, and wherein, in the operating state of the battery module (100), the pockets (12) are connected to one another physically in a foldable manner via the pouch film (3).

19. The battery module (100) according to claim 1, characterized in that the enclosure (20) bears against the battery cell system (1) with the voltage tap as a result of a vacuum generated.

20. The battery module (100) according to claim 1, characterized in that the anode contact lugs (7) and the cathode contact lugs (8) in each case on the same side of the pockets (12) of the pouch cells, in a manner offset with respect to one another, or on mutually opposite sides of the pockets (12) of the pouch cells, project beyond the pocket (12).

21. The battery module (100) according to claim 1, characterized in that the pouch film (3) and the enclosure (20) are folded in each case between the pouch cells (10) arranged in the battery module (100), in a zigzag fold, such that a fold is present after each pouch cell (10).

22. The battery module (100) according to claim 1, characterized in that the anode and cathode contact lugs (7, 8) of in each case two pouch cells (10) of the same battery cell system (1a, 1b), said pouch cells being situated alongside one another, face toward one another and are electrically connected to one another, and in that the pouch film (3)

and the enclosure (20) of the battery module (100) have a fold after each pouch cell (10) of the battery system (1).

23. The battery module (100) according to claim 1, characterized in that the battery module (100) comprises at least one L-shaped cooling plate (57) which is arranged between the pouch cells (10) after each fold, and which is situated within the enclosure (20).

24. The battery module (100) according to claim 23, characterized in that the L-shaped cooling plate (57) comprises an aluminum plate, a carbon and/or a copper.

25. A method for producing a battery module according to claim 1 comprising at least one battery cell system (1), wherein a movement-flexible enclosure (20) is fitted around the at least one battery cell system (1) and around the voltage tap (22) of the battery module (100) by sealing, adhesive bonding, thermal contact welding and/or shrink fitting of the enclosure (20).

26. The battery module (100) according to claim 1, characterized in that the voltage tap is at a right angle with respect to the direction in which the anode and cathode contact lugs (7, 8) extend.

27. The battery module (100) according to claim 1, characterized in that the voltage tap is a line that constitutes an electrical connection between the cell monitoring system and at least one of the anode and cathode contact lugs.

28. The battery module (100) according to claim 1, characterized in that the voltage tap comprises at least one of tabs and balancing lines that electrically contact the cell monitoring system.

\* \* \* \* \*